(12) United States Patent
Kelley

(10) Patent No.: US 6,980,101 B2
(45) Date of Patent: Dec. 27, 2005

(54) MOTOR VEHICLE OCCUPANCY SIGNALING SYSTEM

(76) Inventor: Kalon Lee Kelley, 149 Rametto Rd., Santa Barbara, CA (US) 93108

( * ) Notice: Subject to any disclaimer, the term of this patent is extended or adjusted under 35 U.S.C. 154(b) by 0 days.

(21) Appl. No.: 11/078,239

(22) Filed: Mar. 14, 2005

(65) Prior Publication Data

US 2005/0179563 A1    Aug. 18, 2005

(51) Int. Cl.[7] .............................................. G08B 26/00

(52) U.S. Cl. ...................... 340/505; 340/905; 340/928; 340/933

(58) Field of Search ............................... 340/505, 905, 340/933, 928; 701/300

(56) References Cited

U.S. PATENT DOCUMENTS

| | | | |
|---|---|---|---|
| 5,920,057 A * | 7/1999 | Sonderegger et al. | 235/384 |
| 6,215,395 B1 * | 4/2001 | Slaughter et al. | 340/457.1 |
| 6,587,777 B1 * | 7/2003 | St. Pierre | 701/117 |

* cited by examiner

*Primary Examiner*—Daryl C Pope

(57) ABSTRACT

A system that allows a claim by a registrant as to the number of occupants traveling in a vehicle over a section of highway with a high occupancy vehicle incentive program in place to be transmitted. The registrant is identified by a registrant identifier. The claim about occupancy is optionally visually displayed as the vehicle traverses the highway. The identification of the registrant making the claim is captured by a plurality of reading devices along the highway and transferred to a central processing system. That system determines if a qualified ride-sharing event has occurred, and if so it will then provide for distribution of the program incentives to the registered individual(s).

10 Claims, 4 Drawing Sheets

MOTOR VEHICLE OCCUPANCY SIGNALING SYSTEM

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO A SEQUENCE LISTING, A TABLE, OR COMPUTER PROGRAM LISTING APPENDIX SUBMITTED ON A COMPACT DISC

Not applicable.

BACKGROUND OF THE INVENTION

The present invention relates to the monitoring of claimed passenger occupancy of motor vehicles that are traversing a section of highway that has been designated as one that is advantageous for high occupancy vehicles. An entity (such as a municipality, or state or federal transportation board) may wish to encourage ridesharing by providing incentives to individuals who participate in ridesharing. Some entities currently provide incentives in the form of specially designated lanes where travel may be restricted to high occupancy vehicles, or reduced tolls on toll roads. But in non toll-road environments and on highways without the capacity for designation of high occupancy lanes, other incentives such as reimbursements, tax credits, or special parking privileges could be awarded as incentives for ridesharing if there was a means for reliably identifying ridesharing events that were deemed qualified to receive an incentive.

DESCRIPTION OF RELATED ART

There are currently numerous systems for traffic monitoring and for the automatic identification of a vehicle as it passes through a toll gate, but no system that provides the means for someone to claim a vehicle occupancy level that can be captured for processing as well as being available for enforcement purposes.

SUMMARY OF THE INVENTION

The present invention provides an efficient way of allowing a vehicle occupant to claim an occupancy level that, in the traversing of one or more sections of highway at particular times of day and days of the year, is deemed a "qualifying ride-sharing event" (hereafter QRE) by an agency. Typically an agency would publish a schedule that defines a QRE. For example, a transit with 2 passengers or more from city X to city Y between the hours of 7 to 10 on weekdays (holidays excluded). A driver who anticipates being able to participate in QREs would register with the agency (the program administrator) and obtain a device or plurality of devices that could be placed or attached to a vehicle. This device or devices would at a minimum identify the registrant. Optionally a device would also allow the user to designate a claimed passenger occupancy level.

The information that needs to be collected by the agency includes (a) identification of the registrant, and (b) the number of claimed occupants during a specific QRE. In one version of this invention, the claimed occupancy level is transmitted before the initiation of the transit by a wide-area communications network such as the internet or telephone. In a second version of this invention, the claimed occupancy level is transmitted by a transponder in the vehicle as it passes one or more reading devices. In both versions, the identification of the registrant is made by a transponder as the vehicle passes one or more reading devices. The information collected by a reading device is transmitted for processing to the agency's central computer that can then periodically provide the promised incentives.

Other objects and advantages of the present invention will be apparent to those skilled in this art from the following detailed description in conjunction with the accompanying drawings wherein only two preferred embodiments of the invention are shown and described, simply by way of illustration of how this invention can be implemented. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION OF THE INVENTION

Figure 1:
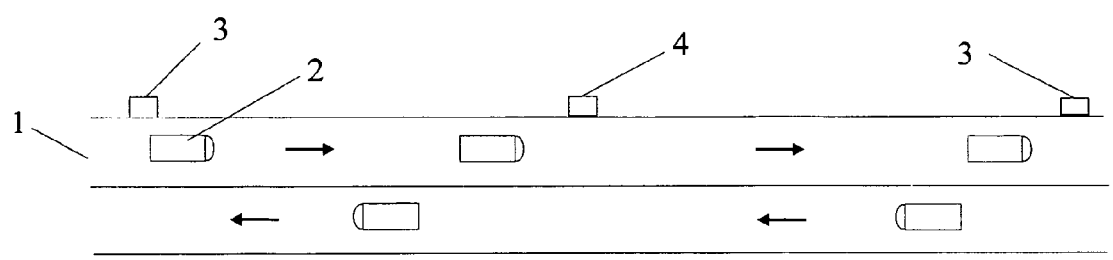
FIG. 1 is a diagram showing a highway with cars on it and the positioning of reading devices at different points along the highway.

Referring to FIG. 1, a highway 1 has a plurality of vehicles 2 traveling thereon. Certain ones of these vehicles have transponders or sending devices that will transmit an identification code when passing by reading device 3. For enforcement purposes, there may be additional reading devices 4 that are stationary on the highway or, alternatively, operated by a mobile enforcement official.

The essence of the sending device is that it transmits a data packet consisting of an identifier (that uniquely identifies the registrant). In one variation of the invention, the claimed occupancy level of that vehicle is also transmitted at this time, while in another variation the claimed occupancy level is communicated prior to the start of travel via a wide area communications network such as the public telephone system or the internet.

The sending device may be active (with electrical source) or passive (such as an RFID device that uses the power from an external signal to generate a response).

Figure 2:
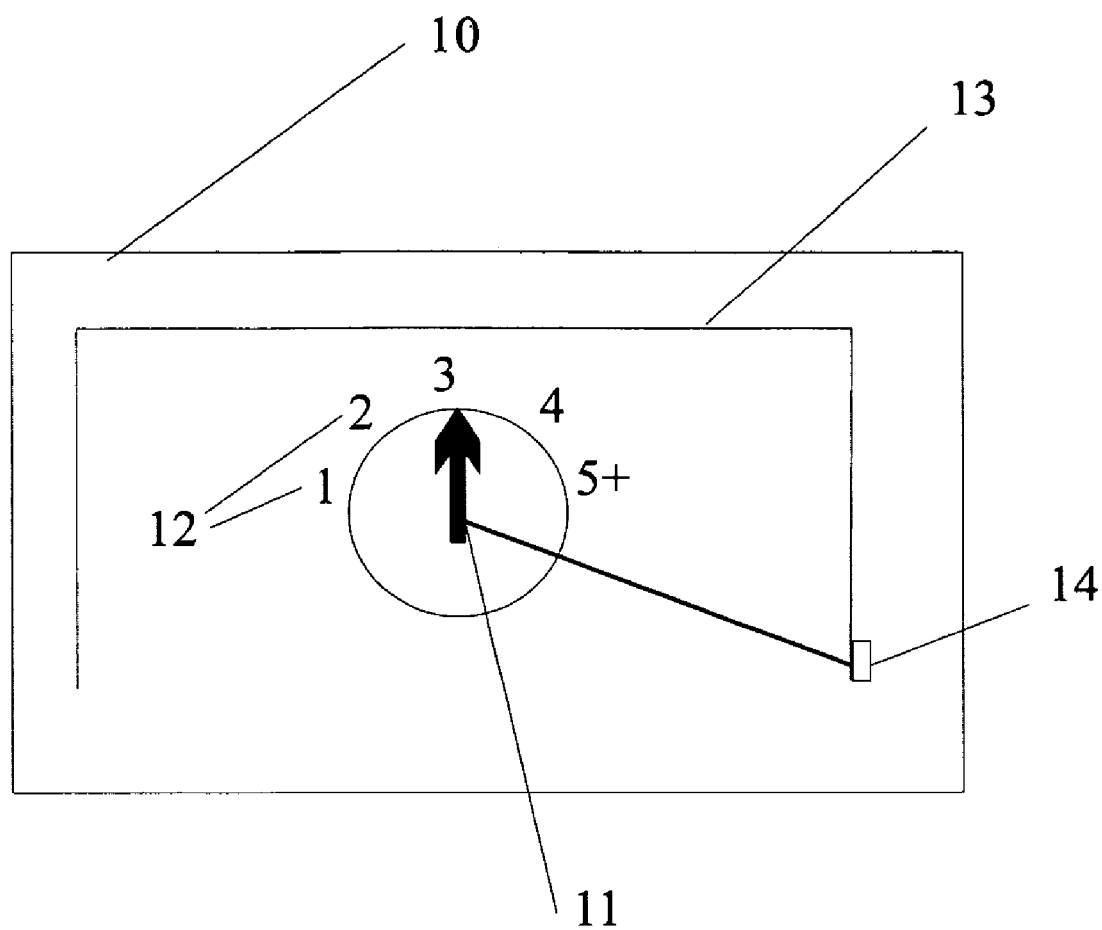
FIG. 2 is a diagram of a transponder or sending device that may be carried or attached to a motor vehicle.

FIG. 2 shows one embodiment of a sending device 10 that is carried or attached to a motor vehicle. This device is shown with a multiple position switch 11 that can point to a claimed occupancy level 12 (occupancy levels of 1 to 5+ are shown in this figure). The device has internal circuitry 14 that is connected to the multiple position switch 11. That circuitry will uniquely identify the transponder and the position of the switch claiming an occupancy level. There is an antenna 13 that is used by the sending device.

Figure 3:
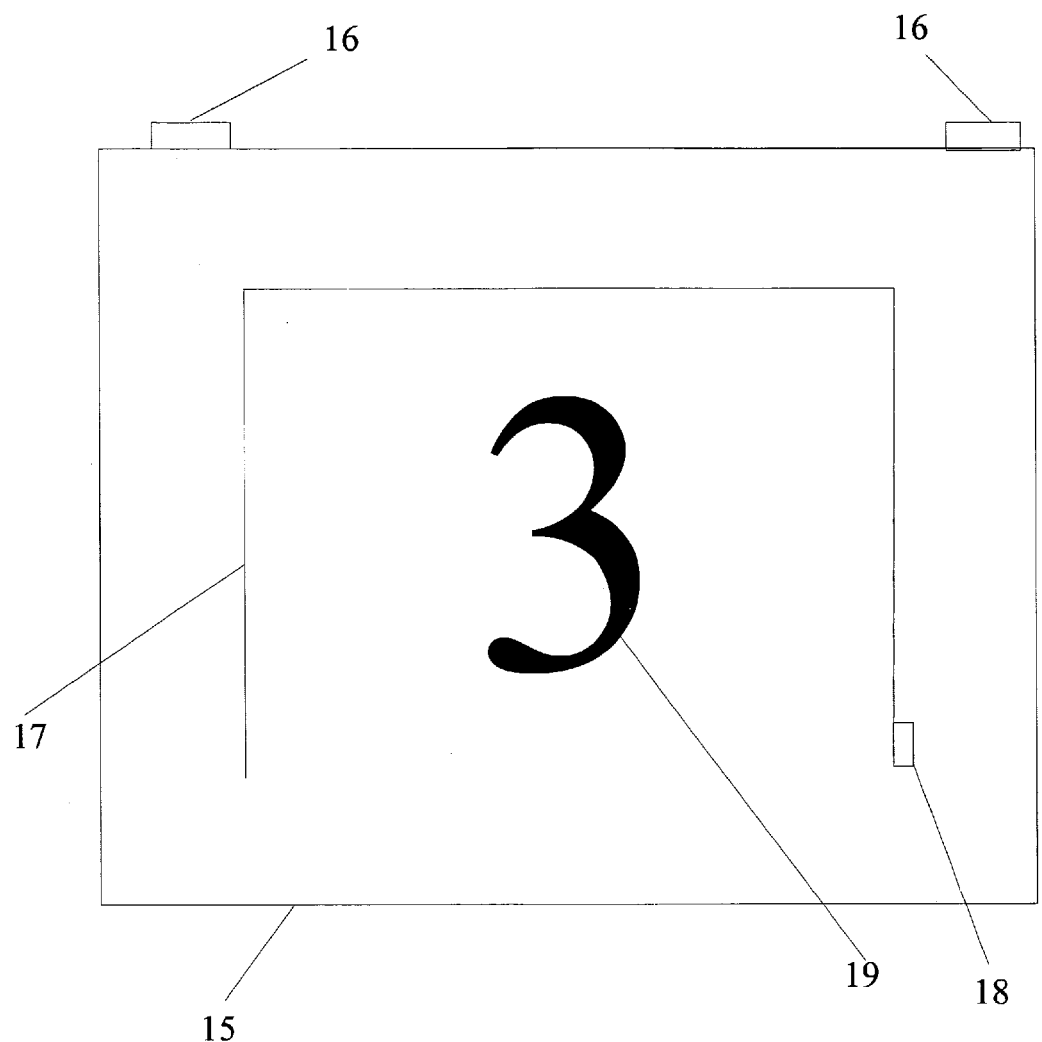
FIG. 3 is a diagram of an alternative sending device that may be carried or attached to a motor vehicle.

FIG. 3 shows a second embodiment of a passive sending device 15. This device could be attached to a car window or windshield with attachment points 16. There is a number 19 that shows the number of claimed occupants (in this figure, the number three). The device has an RFID antenna 17 and circuitry 18. The driver would, upon registration, acquire a number of these devices uniquely identifying the registrant along with a specific number of claimed passengers. At the onset of a QRE, the device that correctly identifies the number of occupants to be claimed would be selected and temporarily mounted, for example, to a window or windshield.

Figure 4:
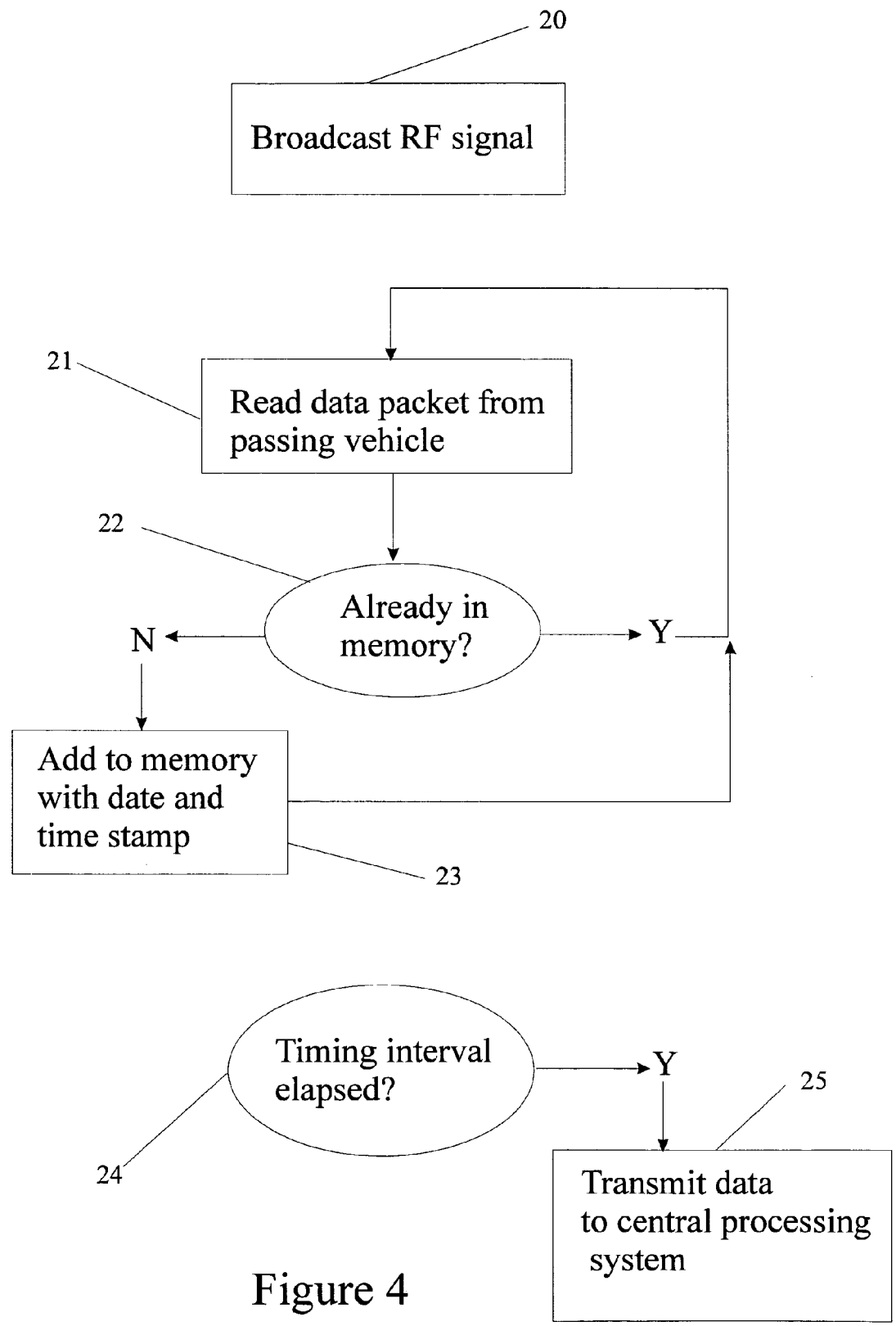
FIG. 4 shows the processing steps of the reading device.

FIG. 4 shows one embodiment of a reading device 3. In this embodiment, the device emits either continuously or intermittently an RF (radio frequency) signal 20. The device has a receiver that is listening for any transmission of a data packet from a passing vehicle within range that is equipped with a sending device 10 or 15. When a packet is received, it is checked 22 against packets already stored in memory, and if not a duplicate a date and time stamp are added to the packet and it is stored in memory 23.

Periodically, at the end of an appropriate timing interval 24, the memory is transmitted 25 to the central processing system for the agency.

What is claimed is:

1. A vehicle occupancy monitoring system wherein a claim is made by a registrant about the number of occupants in a vehicle as it traverses a designated section of highway:
   a transmitter that transmits a claim as to the number of occupants in the vehicle;
   a sending transponder in the vehicle that transmits a code that uniquely identifies the registrant with the program administrator;
   a reading data collector that can interrogate a vehicle within its range, and receive, store and transfer to a central processing facility said transmitted code identifying the registrant along with a time/date stamp.

2. The vehicle occupancy monitoring system of claim 1 further comprising:
   an interface to a wide-area communications network to transmit to the central processing facility prior to the inception of the transit the claimed number of vehicle occupants.

3. The vehicle occupancy monitoring system of claim 1 wherein the said sending transponder also transmits the claimed number of vehicle occupants.

4. The vehicle occupancy monitoring system of claim 2 further comprising:
   a visual display of the number of claimed occupants that can be seen by an enforcement officer outside the vehicle as it traverses the highway.

5. The vehicle occupancy monitoring system of claim 3 further comprising:
   a visual display of the number of claimed occupants that can be seen by an enforcement officer outside the vehicle as it traverses the highway.

6. A method of receiving claimed vehicle occupancy data about a vehicle by a registrant, and also identifying the registrant as the vehicle traverses a designated section of highway, said method comprising the steps of:
   transmitting the number of occupants in a vehicle claimed by a registrant;
   transmitting a signal from the vehicle that identifies the registrant;
   and then receiving the claim by a registrant as to number of occupants in a vehicle and reading the signal from the vehicle that identifies the registrant as the vehicle transits the designated section of highway.

7. The method of claim 6 further comprising the transmission of number of occupants claimed by a registrant via means such as the internet or the public telephone system prior to initiating the highway transit.

8. The method of claim 6 further comprising the transmission of number of occupants claimed by a registrant by a transponder that transmits a signal both identifying the registrant and the number of occupants claimed by that registrant.

9. The method of claim 7 further comprising a visual display of the claimed number of occupants, which display can be seen by an enforcement officer outside the vehicle as it traverses the highway.

10. The method of claim 8 further comprising a visual display of the claimed number of occupants, which display can be seen by an enforcement officer outside the vehicle as it traverses the highway.

* * * * *